United States Patent Office 3,017,420
Patented Jan. 16, 1962

---

3,017,420
PREPARATION OF ORGANIC ISOCYANATES
William D. Schaeffer, Pomona, Calif., assignor to Union Oil Company of California, Los Angeles, Calif., a corporation of California
No Drawing. Filed Oct. 25, 1957, Ser. No. 692,254
6 Claims. (Cl. 260—453)

This invention relates to novel methods for the preparation of organic isocyanates from certain metal cyanates. Briefly, the synthesis is achieved by reacting an alkali metal cyanate, an alkaline earth metal cyanate, or ammonium cyanate with a hydrocarbyl halide containing a halogen bonded to an alkyl carbon atom, the reaction being conducted in the presence of a solvent from the class consisting of N,N-dihydrocarbon-substituted formamides, and hydrocarbyl sulfones. Using alkyl mono-halides and alkali metal cyanates, the general reaction is as follows:

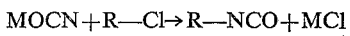
$$MOCN + R\text{—}Cl \rightarrow R\text{—}NCO + MCl$$

Organic isocyanates are usually manufactured by the phosgenation of amines. This process is generally effective where simple isocyanates, e.g. alkyl mono-isocyanates are desired. However, where more complex isocyanates such as hexamethylene diisocyanate are desired, the process becomes expensive due to the difficulty and expense involved in obtaining the appropriate diamine. Moreover, the phosgenation reaction employs dangerous and toxic materials and is difficult to control and does not give good yields in all cases. There is hence a need for a simple and more direct method for producing organic isocyanates.

It is known that alkyl isocyanates can be prepared by reacting alkyl sulfates with potassium cyanate. However this process has several disadvantages. Due to the presence of sulfur dioxide resulting from decomposition of the sulfate, the isocyanate produced has a tendency to polymerize. Low yields are hence obtained and moreover the reaction is difficult to control.

It is also known that alkyl halides can be reacted with heavy metal cyanates such as silver or mercury cyanates. However, to the best of my knowledge no one has previously succeeded in obtaining appreciable yields of organic isocyanates by reacting alkali metal cyanates directly with alkyl halides.

The principal object of my invention is therefore to provide means for obtaining good yields of organic isocyanates directly from cheap alkali metal cyanates. A further object is to provide means whereby readily obtainable polyhalo hydrocarbons may be cheaply converted to polyisocyanates. Still another object is to provide specific solvents for the reaction of hydrocarbon halides with alkali metal cyanates. Other objects will be apparent from the description which follows.

The success of my process is attributed to the specific action of the solvents employed. These solvents are for the most part high-boiling, inert chemicals which take no chemical part in the reaction, but serve effectively as a solvent for the metal cyanates employed, as well as the organic materials present. Suitable N,N-dihydrocarbon-substituted formamides include those wherein the hydrocarbon substituents are alkyl, aryl or cycloalkyl, for example: N,N-dimethyl formamide, N,N-diethyl formamide, N,N-dipropyl formamide, N,N-dihexyl formamide, N,N-dicyclohexyl formamide, N,N-diphenyl formamide, as well as mixed di-substituted compounds such as N-methyl N-ethyl formamide, N-phenyl N-methyl formamide, etc.

Suitable organic sulfones include in general the dialkyl sulfones, the dinaphthenyl sulfones, the diaryl sulfones, and mixed sulfones. Suitable sulfones include for example dimethyl sulfone, diethyl sulfone, dipropyl sulfone, di-n-butyl sulfone, dicyclohexyl sulfone, diphenyl sulfone, and the like.

Suitable reaction temperatures range between about 25° and 250° C., preferably between about 70° and 175° C. The optimum temperature will vary depending upon the specific isocyanate to be formed. All of the isocyanates are somewhat unstable in that they tend to trimerize at high temperatures and with time. It is therefore preferable to remove the isocyanate from the reaction zone as rapidly as possible. Where this is impractical, resort may be had to the use of larger excesses of solvent, and/or a large mole excess of organic halide or metal cyanate. Where low-boiling isocyanates are concerned, a preferred mode of procedure consists in first dissolving the metal cyanate, or suspending it, in a high-boiling solvent. The organic halide is then vaporized and passed through the solvent-salt mixture at a temperature above the boiling point of the isocyanate to be formed. In this manner the isocyanate may be removed substantially as rapidly as it is formed.

In the case of relatively high-boiling isocyanates such as di-isocyanates and poly-isocyanates, it is preferable to work in the presence of a large mole-excess of the halide and to maintain temperatures below about 150° C. It is also feasible to operate with a large mole-excess of the metal cyanate. A mole excess of either of the reactants will accelerate the complete conversion of the other reactant to the desired isocyanate while limiting the opportunity for the isocyanate to polymerize or decompose. When the reaction is completed, the desired isocyanate may be recovered by distillation under reduced pressure.

Suitable metal cyanates include for example the cyanates of sodium, potassium, lithium, beryllium, magnesium, calcium, strontium and barium. Ammonium cyanate may be used, preferably at low temperatures, e.g. below about 85° C. The preferred salts comprise the alkali metal cyanates.

The halide employed must be one containing a halogen atom bonded to an alkyl carbon atom. Either mono halides or polyhalides containing not more than one halogen atom on any one carbon atom may be employed, and the term "halide" is meant to include all the halogens, i.e. fluorine, chlorine, bromine, and iodine. Suitable organic halides include for example, methyl bromide, ethyl bromide, ethyl chloride, ethyl iodide, ethyl fluoride, n-propyl bromide, n-propyl iodide, isopropyl bromide, 1-bromo n-hexane, 1-bromo n-dodecane, ethylene dibromide, 1,3-propylene dichloride, 1,4-butylene dichloride, chlorocyclohexane, 1,4-dibromo cyclohexane, 1,3-dibromo cyclohexane, 1,2-dibromo cyclohexane, 1,4-dichloro cyclohexane, 1,2,4,5-tetrabromo cyclohexane, benzyl chloride, benzyl bromide, benzyl iodide, β-phenylethylchloride, α-phenylethylchloride, 4-chloro benzyl chloride (the nuclear halogen remains inert), p-xylylene dichloride, p-xylylene dibromide, m-xylylene dichloride, m-xylylene dibromide, o-xylylene dichloride, o-xylylene dibromide, 1,2,4,5-tetra(chloromethyl benzene), α-chloromethyl naphthalene, 1,4-di(chloromethyl naphthalene), 1,5-di(bromomethyl naphthalene), and the like.

The following examples are cited to illustrate suitable techniques, but are not intended to be limiting in scope.

EXAMPLE I

*Preparation of ethyl isocyanate*

About 250 ml. of dimethyl sulfone is placed in a 3-necked flask and 81 grams of potassium cyanate is added. The temperature is brought up to about 90° C. and vapors of ethyl bromide are passed through the mixture slowly with agitation. Product vapors are collected and condensed continuously. After 109 grams of ethyl-bromide has been passed into the flask, the reaction is stopped and the condensate is fractionated to recover ethyl isocyanate boiling at 60° C., d. 0.8981. The yield of ethyl isocyanate based on ethyl bromide converted is in excess of 95%.

EXAMPLE II

Preparation of n-butyl isocyanate

To a 500-ml. 3-necked flask equipped with a stirrer and a small distillation column was added 200 ml. of dry, freshly distilled dimethyl formamide, 27 grams (0.3 mole) of potassium cyanate, and 41.1 grams (0.3 mole) of n-butyl bromide. The mixture was stirred and heated to reflux. The boil-up in the column was collected rapidly over several minutes without allowing much reflux. The distillate was collected over the boiling range 116–150° C. Upon fractionating the product, a 70% yield of butyl isocyanate was obtained, boiling point 114° C.

EXAMPLE III

Preparation of ethylene diisocyanate

About 200 ml. of diphenyl sulfone is placed in a 500-ml. 3-necked flask equipped with a stirrer and outlet condenser, and 65 grams of sodium cyanate is added. The condenser outlet is connected to a product-receiving flask and pressure-reducing pump. Vapors of ethylene dibromide are then passed through the reaction flask at about 200° C. and 250 mm. pressure with good agitation. Product vapors are continuously condensed and collected. After about 60 grams of ethylene dibromide has been supplied, the reaction is terminated. Upon fractionation of the product in the receiving flask, unreacted ethylene dibromide is readily recovered, leaving ethylene diisocyanate (B.P. about 125° C. at 100 mm.) in good yield.

EXAMPLE IV

Preparation of hexamethylene diisocyanate

About 122 grams (0.5 mole) of hexamethylene dibromide, 250 ml. of dimethyl formamide, and 81 grams of potassium cyanate are placed in a flask and heated at 150° C. for 30 minutes with stirring. The reaction mixture is then distilled at 200 mm. pressure to recover first the dimethyl formamide, then the excess hexamethylene dibromide, and finally the product hexamethylene diisocyanate boiling at about 140° C. at 20 mm. The yield based on KOCN is about 80%.

EXAMPLE V

Preparation of p-xylylene diisocyanate

The procedure of Example IV is repeated except that 87.5 grams of p-xylylene dichloride is employed in place of the hexamethylene dibromide. The yield of p-xylylene diisocyanate (B.P. about 180° at 20 mm.) is in excess of 50%, based on KOCN.

Results analogous to the foregoing are obtained when other metal cyanates, or other organic halides are substituted in the foregoing examples. It is therefore not intended to limit the invention to the exemplary details above described. The true scope of the invention is intended to be embraced by the following claims.

I claim:
1. A process for preparing an organic isocyanate which comprises reacting a hydrocarbyl halide containing a halogen atom bonded to an alkyl carbon atom and not more than one halogen atom on any one carbon atom, with a cyanate of a metal selected from the class consisting of the alkali metals and alkaline earth metals, said reaction being conducted between about 25° and 250° C., in the presence of a solvent consisting essentially of a hydrocarbyl sulfone wherein the hydrocarbyl radicals are selected from the class consisting of alkyl, naphthenyl and aryl, and recovering organic isocyanate from the reaction mixture.

2. A process as defined in claim 1 wherein said solvent is dimethyl sulfone.

3. A process as defined in claim 1 wherein said solvent is diphenyl sulfone.

4. A process for preparing an organic isocyanate which comprises first forming a mixture of (1) a cyanate of a metal selected from the class consisting of the alkali metals and alkaline earth metals, and (2) a solvent consisting essentially of a hydrocarbyl sulfone wherein the hydrocarbyl radicals are selected from the class consisting of alkyl, naphthenyl and aryl; passing through said mixture vapors of a hydrocarbyl halide corresponding to the desired isocyanate, said hydrocarbyl halide containing a halogen atom bonded to an alkyl carbon atom and not more than one halogen atom on one carbon atom, said contacting being carried out at a temperature between about 25° and 250° C., and above the boiling point of said isocyanate at the reaction pressure, and continuously withdrawing vapors of said isocyanate.

5. A process as defined in claim 4 wherein said contacting is carried out at a temperature between about 70° and 175° C.

6. A process for preparing a hydrocarbyl diisocyanate which comprises reacting a hydrocarbyl dihalide containing two halogen atoms bonded to alkyl carbon atoms and not more than one halogen atom on any one carbon atom, with a cyanate of a metal selected from the class consisting of alkali metals and alkaline earth metals, said contacting being carried out at a temperature between about 25° and 250° C. and in the presence of a solvent consisting essentially of a hydrocarbyl sulfone wherein the hydrocarbyl radicals are selected from the class consisting of alkyl, naphthenyl and aryl, and recovering diisocyanate from the reaction mixture.

References Cited in the file of this patent

UNITED STATES PATENTS

| | | |
|---|---|---|
| 2,866,801 | Himel | Dec. 30, 1958 |
| 2,884,360 | Bloom et al. | Apr. 28, 1959 |
| 2,901,497 | Delfs et al. | Aug. 25, 1959 |

OTHER REFERENCES

E. H. Rodd: Chemistry of Carbon Compounds, vol. 1, part B (1952), p. 939.

"Handbook of Chemistry and Physics," 34th ed. (1952–53), pp. 452–3.